UNITED STATES PATENT OFFICE.

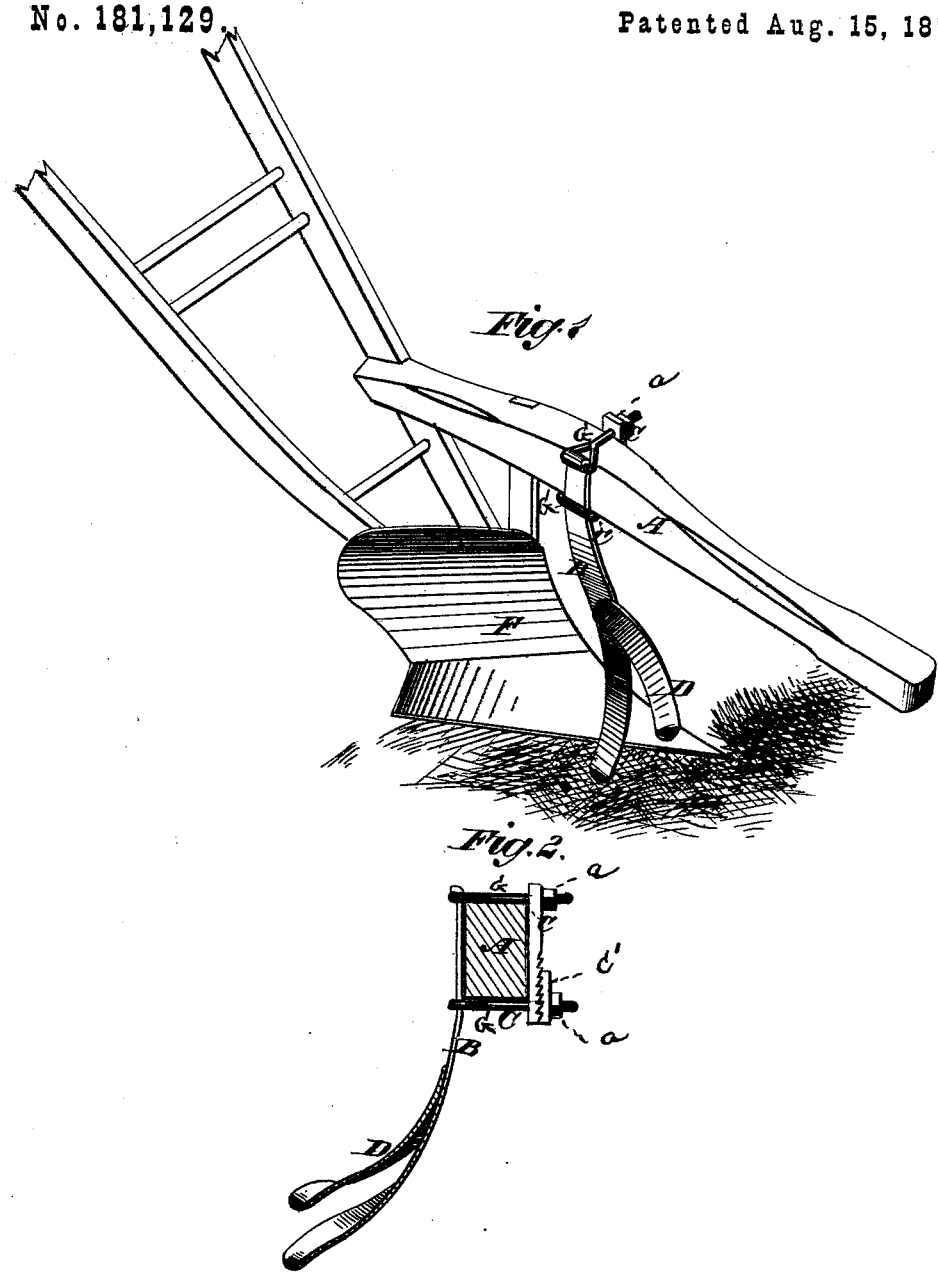

WILLIAM BANWORTH, OF ELIZABETH, ILLINOIS.

IMPROVEMENT IN WEED-TURNERS FOR PLOWS.

Specification forming part of Letters Patent No. 181,129, dated August 15, 1876; application filed August 14, 1875.

*To all whom it may concern:*

Be it known that I, WILLIAM BANWORTH, of Elizabeth, Jo Daviess county, Illinois, have invented a new and Improved Corn-Stalk, Brush, Grass, and Weed Laying Attachment for Plows, of which the following is a specification:

My invention consists of one or more arms or bars attached to the beam of a plow in such a manner that they break and press down the weeds upon the furrow-slice as it is being turned over, so as to be effectually covered.

Figure 1 is a perspective view of a plow with my improved weed-covering attachment, and Fig. 2 is a section of the beam.

Similar letters of reference indicate corresponding parts.

A is the plow-beam. B represents a crooked or curved iron bar, to which is attached an additional bar, D, at or near its center, and which extends forward of the bar B, as shown in Fig. 1. The bar B, with its prong D, is attached, at any suitable point in front of the plow F, by means of two eyebolts, G G, one above and the other below the beam, having their screw ends passing between a vertical plate, C, on the outside of the plow-beam. The lower edge of the plate, on its exterior, is serrated, as shown in Fig. 2, and a small serrated plate, C', is placed adjacent thereto, through which the lower eyebolt passes. Nuts *a a* on the ends of the bolts effectually clamp the bar and its prong to the beam. By this mode of connection the bar is held close and tight to the beam, and it can be readily adjusted thereto in case of shrinkage of the wooden beam.

The bars B D are suitably shaped to press the weeds and grass close down on the surface of the furrow just as it is being turned over by the plow, so that they will be laid on the bottom of the furrow and effectually covered.

I do not claim an angular weed-turner adjustably connected by clamp-bolts to a plow-beam, as I am aware such is not new.

Having thus described my invention, I claim as new and desire to secure by Letters Patent—

The curved bar B, having forward-extending bar D, and secured to a plow-beam by the eyebolts G G, serrated plates C C', and nuts *a a*, all substantially as and for the purposes set forth.

WILLIAM BANWORTH.

Witnesses:
 J. P. FRASER,
 E. R. KITTOE.